US011949174B1

(12) United States Patent
Li et al.

(10) Patent No.: US 11,949,174 B1
(45) Date of Patent: Apr. 2, 2024

(54) BROADBAND FIFTH-GENERATION CIRCULARLY POLARIZED FILTERING ANTENNA

(71) Applicant: Anhui University, Hefei (CN)

(72) Inventors: Yingsong Li, Hefei (CN); Wen Li, Harbin (CN); Zhixiang Huang, Hefei (CN); Lixia Yang, Hefei (CN)

(73) Assignee: ANHUI UNIVERSITY, Hefei (CN)

( * ) Notice: Subject to any disclaimer, the term of this patent is extended or adjusted under 35 U.S.C. 154(b) by 0 days.

(21) Appl. No.: 18/347,060

(22) Filed: Jul. 5, 2023

(30) Foreign Application Priority Data

Sep. 15, 2022 (CN) ......................... 202211123675.6

(51) Int. Cl.
*H01Q 9/04* (2006.01)
*H01Q 1/48* (2006.01)
*H01Q 9/06* (2006.01)
*H01Q 15/14* (2006.01)

(52) U.S. Cl.
CPC ............. *H01Q 9/0435* (2013.01); *H01Q 1/48* (2013.01); *H01Q 9/065* (2013.01); *H01Q 15/14* (2013.01)

(58) Field of Classification Search
CPC ...... H01Q 9/0435; H01Q 9/065; H01Q 15/14; H01Q 1/38; H01Q 9/0457
See application file for complete search history.

(56) References Cited

U.S. PATENT DOCUMENTS

2019/0089047 A1* 3/2019 Hara ...................... H01Q 21/22
2019/0115651 A1* 4/2019 Driscoll ............... H01Q 1/3233
2021/0376450 A1* 12/2021 Ryoo ................... H01Q 1/2283
2022/0407233 A1* 12/2022 Woo ......................... H01Q 1/48
2023/0020224 A1* 1/2023 Ueda ...................... H01Q 9/065

FOREIGN PATENT DOCUMENTS

CN 104937405 A 9/2015
CN 111525250 B * 3/2022 ............... H01Q 1/36
WO WO-2021147782 A1 * 7/2021 ............. H01Q 1/246

OTHER PUBLICATIONS

Author unknown, "A H2S microsensor forprofiling biofilms and sediments: Application in an acidic lake sediment" Aquatic Microbial Ecology, Jul. 1998, 10 pages.
Jeroschewski, et al. "An Amperometric Microsensor for the Determination of H2S in Aquatic Environments" Anal. Chem. 1996, 68, 4351-4357.
Author Unknown, "An oxygen microsensor with a guard cathode" Limnol. Oceanogr., 34(2). 1989, 474-478.
Nielsen et al. "Hydrogen microsensors with hydrogen sulfide traps" Sensors and Actuators B 215 (2015) 1-8.
Nakano, et al. "Preparation of thin gold-film electrode for an electrochemical gas sensor for phosphine and arsine" Sensors and Actuators B 21 (1994) 51-55.

* cited by examiner

*Primary Examiner* — Ricardo I Magallanes
(74) *Attorney, Agent, or Firm* — Stuart H. Mayer; Kaplan Breyer Schwarz LLP

(57) ABSTRACT

A broadband fifth-generation (5G) circularly polarized filtering antenna includes a reflecting plate, a first dielectric substrate, a second dielectric substrate, a third dielectric substrate, a fourth dielectric substrate, a feed line with a phase adjustment function print on one surface of the first dielectric substrate, a ground with a chair-like groove on an other surface of the first dielectric substrate, a first rectangular radiating unit, a second rectangular radiating unit, a first metal transmission strip group and a second metal transmission strip group.

6 Claims, 8 Drawing Sheets

BROADBAND FIFTH-GENERATION CIRCULARLY POLARIZED FILTERING ANTENNA

CROSS-REFERENCE TO RELATED APPLICATIONS

This application claims priority to Chinese Patent Application No. 202211123675.6, filed on Sep. 15, 2022, the contents of which are hereby incorporated by reference.

TECHNICAL FIELD

The application relates to the technical field of antenna design, and in particular to a broadband $5^{th}$-generation (5G) circularly polarized filtering antenna.

BACKGROUND

With the development of wireless communication technology, mobile communication technology, which is at the forefront of wireless communication development, has rapidly transitioned from 3G to 5G. The important breakthrough in 5G is the rapid development of antenna technology, which also brings the rapid development of antenna. However, most of the traditional 5G antennas use linearly polarized antennas, including vertically polarized antennas, horizontally polarized antennas and dual-polarized antennas. However, when these linearly polarized antennas transmit and receive signals, they will cause space electromagnetic waves to rotate, thus degrading the performance of the antennas.

However, circularly polarized antennas are able to not only effectively overcome the troubles caused by a rotation of space electromagnetic waves, but also resist the interference of space because the circularly polarized antennas are able to prevent the multipath distortion and polarization mismatch loss caused by Faraday rotation effect when transmitting and receiving signals. Circularly polarized antennas are able to reduce polarization mismatch, suppress multipath interference, and have greater flexibility at the transmitting end and receiving end. In order to realize circularly polarized radiation, a simple method is to feed patches in two orthogonal directions and generate two orthogonal resonance modes by double-ended feeding, so as to design the circularly polarized antenna. In addition, the circularly polarized antennas are also designed by truncated corners, but the bandwidth of the antennas is relatively narrow. At the rear of wireless communication system, filters are often used to filter out unnecessary out-of-band signals received by antennas, which is costly and the system is increasingly complex.

SUMMARY

In order to solve the problem of high cost and high complexity in filtering the out-of-band signals in the prior art, the application provides a broadband $5^{th}$-generation (5G) circularly polarized filtering antenna. The broadband 5G circularly polarized filtering antenna is able to make use of the performance of a circularly polarized antenna, filter the out-of-band signals, provide services for 5G, filter out unnecessary out-of-5G frequency band signals, reduce a use of filters or the design requirements of the filters, reduce the cost for mobile communication and improve the performance of the antenna.

In order to achieve the above technical objectives, the present application provides the following technical scheme.

A broadband 5G circularly polarized filtering antenna includes a reflecting plate, a first dielectric substrate, a second dielectric substrate, a third dielectric substrate and a fourth dielectric substrate. The reflecting plate, the first dielectric substrate and the second dielectric substrate are arranged from bottom to top and are filled with air in middle of the reflecting plate, first dielectric substrate and the second dielectric substrate. The third dielectric substrate and the fourth dielectric substrate are installed between the first dielectric substrate and the second dielectric substrate, and the third dielectric substrate and the fourth dielectric substrate are arranged in parallel. An upper surface of the first dielectric substrate is provided with a ground with a chair-like groove. A lower surface of the first dielectric substrate is provided with a feed line. The feed line is vertically aligned with a center of the third dielectric substrate and the chair-like groove on the ground with the chair-like groove are correspondingly arranged with the third dielectric substrate and the fourth dielectric substrate.

The third dielectric substrate is provided with a first metal transmission strip group, and the fourth dielectric substrate is provided with a second metal transmission strip group. The first metal transmission strip group and the second metal transmission strip group are symmetrically arranged. The first metal transmission strip group and the second metal transmission strip group are in contact with the ground with the chair-like groove and are correspondingly arranged with the chair-like groove on the ground with the chair-like groove.

Optionally, the chair-like groove on the ground with the chair-like groove includes a first groove, a second groove and a third groove, where the third groove and the second groove are communicated with the first groove, and angles formed by the second groove and the third groove and the first groove are equal. The first groove is arranged between the first metal transmission strip group and the second metal transmission strip group and parallel to the first metal transmission strip group and the second metal transmission strip group.

Optionally, the feed line includes a first phase regulator, a second phase regulator, a first impedance converter, a second impedance converter and a third impedance converter, where the first phase regulator and the second phase regulator are connected with the third impedance converter. The second impedance converter and the third impedance converter are connected through the first impedance converter. The chair-like groove corresponds to a joint of the first impedance converter and the second impedance converter.

Optionally, the first metal transmission strip group includes a first metal transmission strip, a second metal transmission strip and a third metal transmission strip, where the first metal transmission strip, the second metal transmission strip and the third metal transmission strip are arranged at one side of the third dielectric substrate away from the fourth dielectric substrate at equal intervals.

Optionally, the second metal transmission strip group includes a fourth metal transmission strip, a fifth metal transmission strip and a sixth metal transmission strip, where the fourth metal transmission strip, the fifth metal transmission strip and the sixth metal transmission strip are arranged on one side of the fourth dielectric substrate adjacent to the third dielectric substrate at equal intervals.

Optionally, an upper surface of the second dielectric substrate is provided with a first rectangular radiating unit and a second rectangular radiating unit, where the first rectangular radiating unit is connected with the first metal transmission strip group. The second rectangular radiating unit is connected with the second metal transmission strip group, and the first rectangular radiating unit and the second rectangular radiating unit are symmetrically arranged to form a dipole pair.

Optionally, the reflecting plate adopts a copper plate.

Optionally, a phase of the antenna is controlled by controlling and adjusting the feed line and shapes of the chair-like groove on the ground with the chair-like groove.

The application has the following technical effects.

The broadband 5G circularly polarized filtering antenna provided by the application adopts a multi-layer antenna structure, adjusts the phase and adjusts the bandwidth and axial ratio bandwidth of the circularly polarized antenna by designing the feed line with the phase adjustment function and the size of the chair-like groove on the ground with the chair-like groove on one surface of the first dielectric substrate. The metal transmission strips on the third dielectric substrate and the fourth dielectric substrate form a filter structure to provide a rectangular filter coefficient, thereby realizing a good filtering function and reducing the interference to the antenna. A phase difference of the antenna is controllable, which contributes to adjusting the bandwidth of circular polarization. The metal transmission strips only realize the filtering function, but also are connected with the radiating unit to provide high gain. The 5G circularly polarized antenna designed by the application has circular polarization characteristics, large bandwidth, filtering characteristics, wide axial specific bandwidth and 3-dB beam width, is compact in structure, is applicable to mobile communication, provides services for 5G, and is also applicable to mobile communication systems, such as satellite communication, and has a good application prospect.

BRIEF DESCRIPTION OF THE DRAWINGS

In order to explain the embodiments of the present application or the technical scheme in the prior art more clearly, the drawings needed in the embodiments will be briefly introduced below. Obviously, the drawings in the following description are only some embodiments of the present application. For ordinary people in the field, other drawings may be obtained according to these drawings without making creative efforts.

DETAILED DESCRIPTION OF THE EMBODIMENTS

Figure 1:
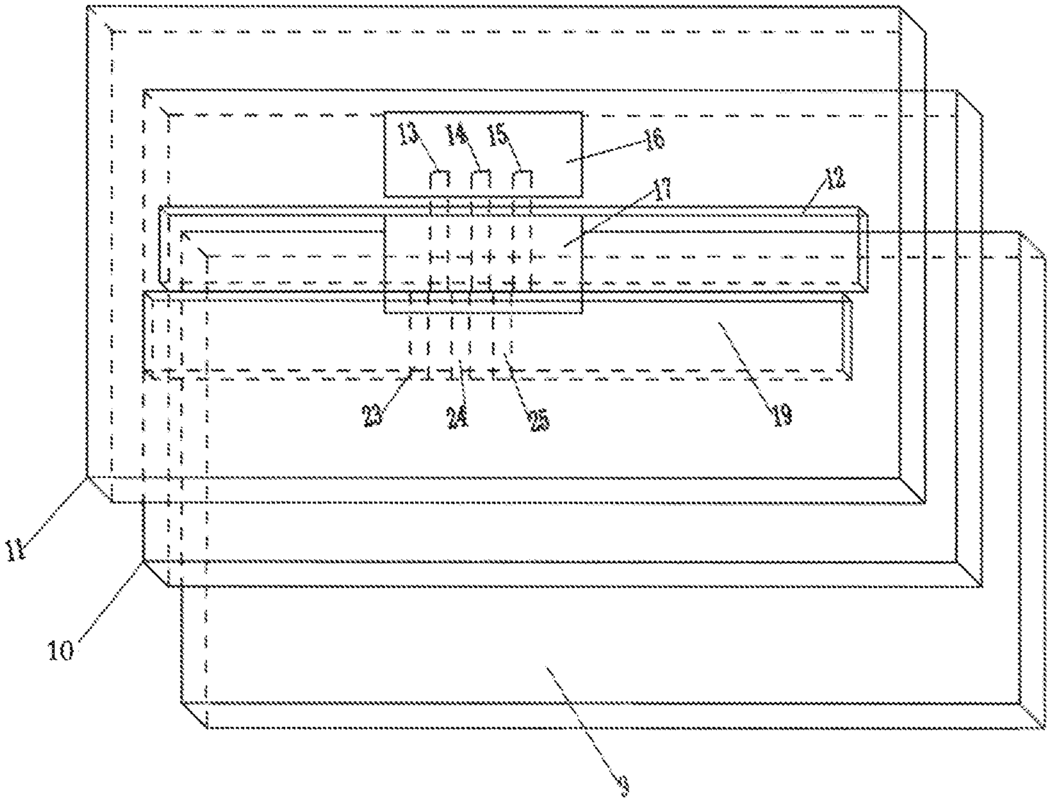
FIG. 1 is a three-dimensional structural diagram of a broadband fifth-generation (5G) circularly polarized filtering antenna provided by an embodiment of the present application.
Figure 2:
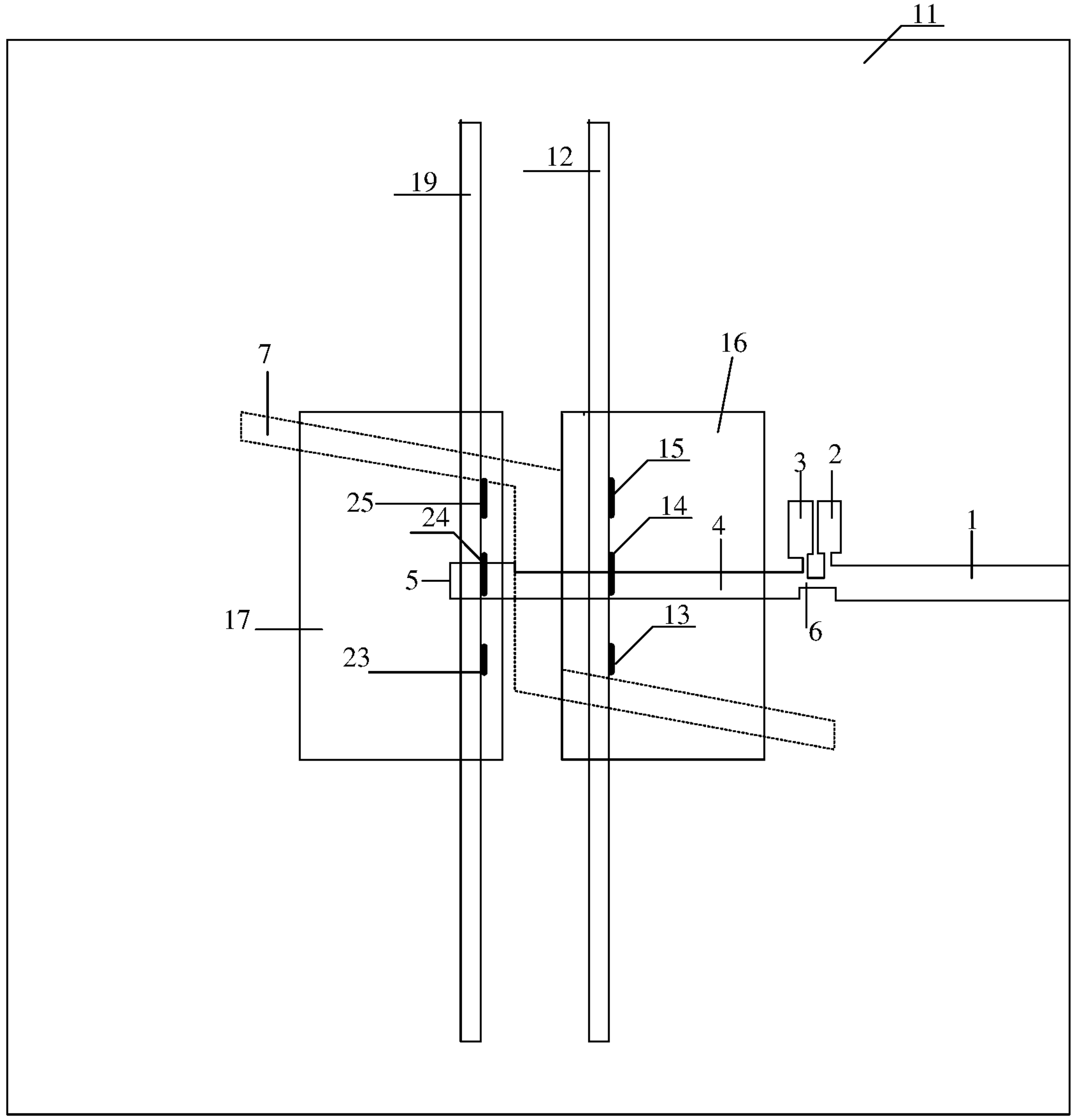
FIG. 2 is a top view of a broadband 5G circularly polarized filtering antenna provided by an embodiment of the present application.
Figure 3:
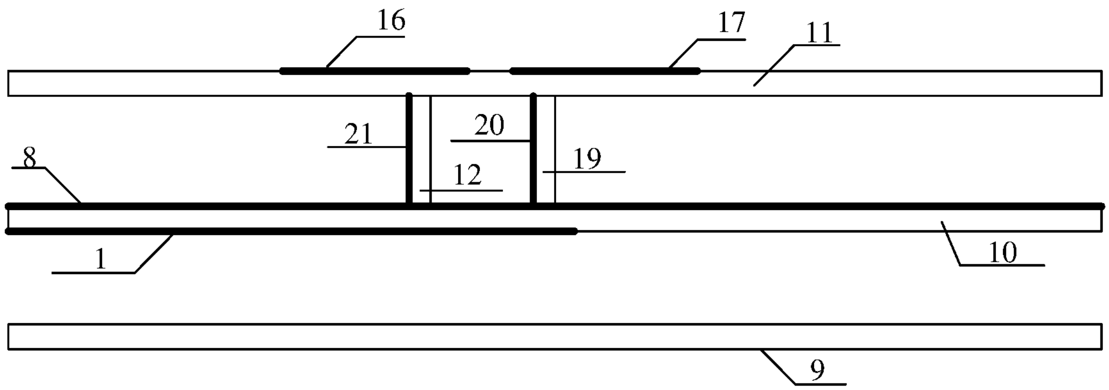
FIG. 3 is a side view of a broadband 5G circularly polarized filtering antenna provided by an embodiment of the present application.
Figure 4:
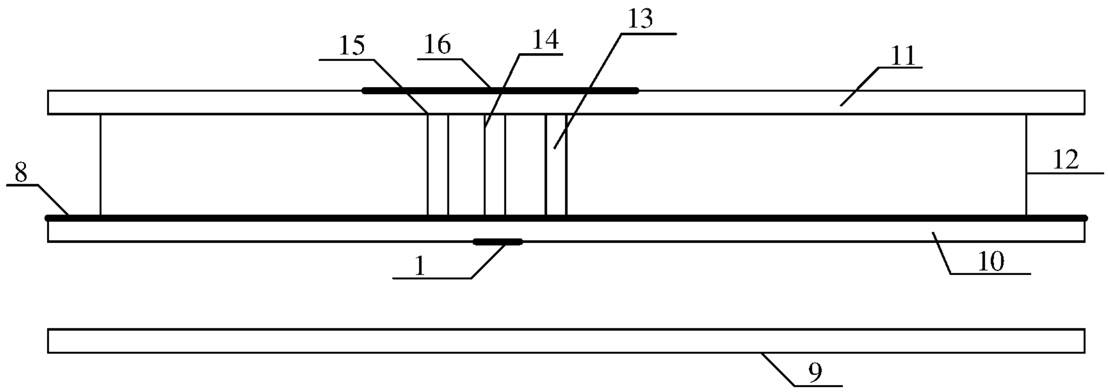
FIG. 4 is a front view of a broadband 5G circularly polarized filtering antenna provided by an embodiment of the present application.

In the following, the technical scheme in the embodiment of the application will be clearly and completely described with reference to the attached drawings. Obviously, the described embodiment is only a part of the embodiment of the application, but not the whole embodiment. Based on the embodiments in the present application, all other embodiments obtained by ordinary technicians in the field without creative efforts belong to the scope of protection of the present application.

In order to solve the problems existing in the prior art, the application provides the following scheme.

A broadband 5G circularly polarized filtering antenna includes a reflecting plate 9, a first dielectric substrate 10, a second dielectric substrate 11, a third dielectric substrate 12 and a fourth dielectric substrate 19. The reflecting plate 9, the first dielectric substrate 10 and the second dielectric substrate 11 are arranged from bottom to top and are filled with air in middle of the reflecting plate, first dielectric substrate and the second dielectric substrate. The third dielectric substrate 12 and the fourth dielectric substrate 19 are installed between the first dielectric substrate 10 and the second dielectric substrate 11, and the third dielectric substrate 12 and the fourth dielectric substrate 19 are arranged in parallel. The upper surface of the first dielectric substrate 10 is provided with a ground 8 with a chair-like groove, and a lower surface of the first dielectric substrate 10 is provided with a feed line 1. The feed line 1 is vertically aligned with a center of the third dielectric substrate 12. The chair-like groove 7 on the ground 8 with the chair-like groove are correspondingly arranged with the third dielectric substrate 12 and the fourth dielectric substrate 19. A first groove of the chair-like groove 7 is between the third dielectric substrate 12 and fourth dielectric substrate 19 and parallel to the third dielectric substrate 12 and fourth dielectric substrate 19.

The third dielectric substrate 12 is provided with a first metal transmission strip group 21, and the fourth dielectric substrate 19 is provided with a second metal transmission strip group 20. The first metal transmission strip group 21 and the second metal transmission strip group 20 are symmetrically arranged. The first metal transmission strip group 21 and the second metal transmission strip group 20 are same in structures. The first metal transmission strip group 21 and the second metal transmission strip group 20 are in contact with the ground 8 with the chair-like groove and are correspondingly arranged with the chair-like groove 7 on the ground 8 with the chair-like groove. A parallel length of the first groove of the chair-like groove 7 is longer than the first metal transmission strip group 21 and the second metal transmission strip group 20.

Figure 6:
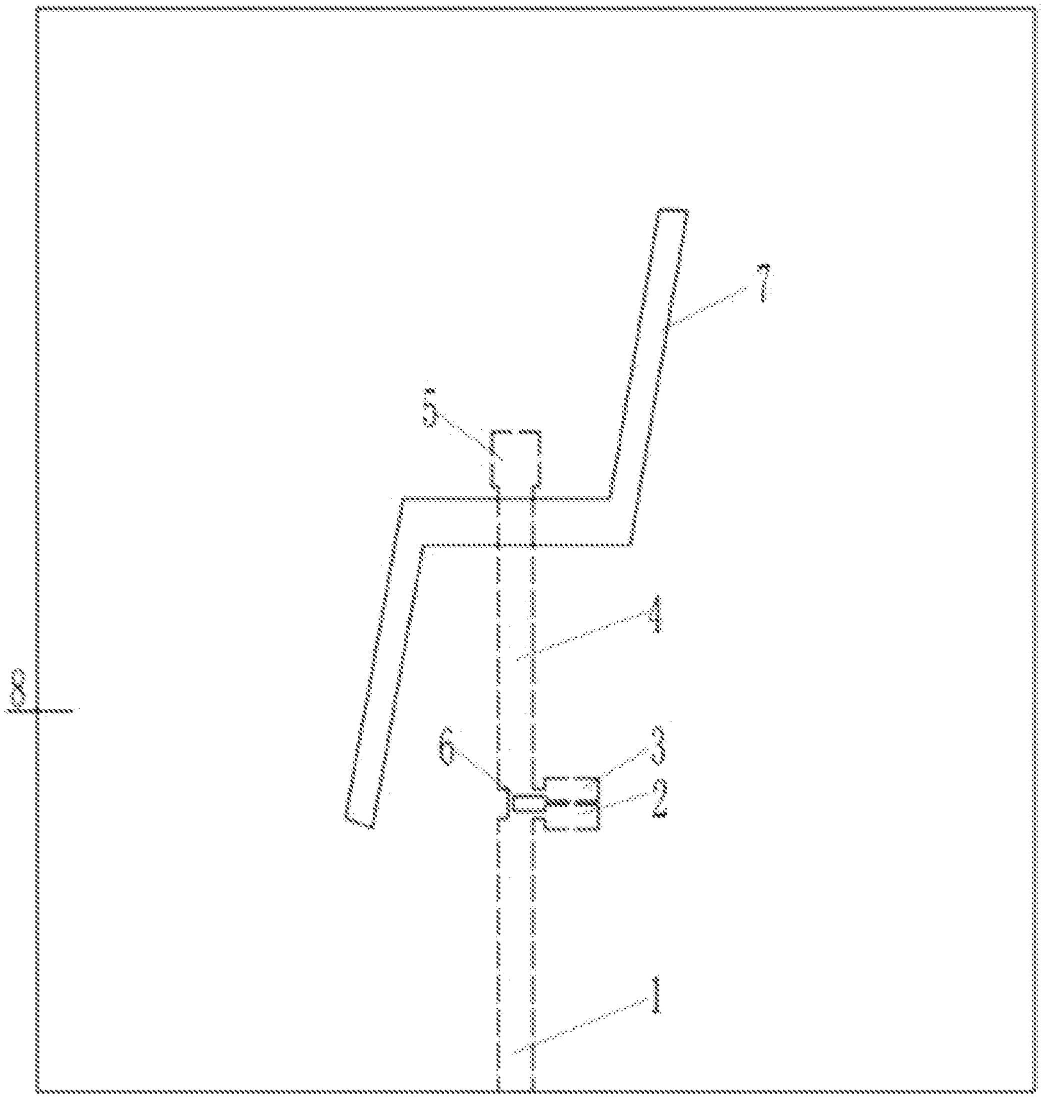
FIG. 6 is a schematic diagram of a ground with a chair-like groove provided by an embodiment of the present application.

In an embodiment, the chair-like groove 7 on the ground 8 with the chair-like groove includes a first groove, a second groove and a third groove, where the third groove and the second groove are communicated with the first groove. The chair-like groove 7 is in a shape of chair-like, including three segments of straight grooves, as shown in FIG. 6. In FIG. 6, the three segments of the straight grooves are defined as the second groove, the first groove and the third groove from left to right, with corners positioned as divisions. Angles formed by the second groove and the third groove and the first groove are equal. The first groove is arranged between the first metal transmission strip group 21 and the second metal transmission strip group 20 and parallel to the first metal transmission strip group 21 and the second metal transmission strip group 20. The first metal transmission strip group 21 and the second metal transmission strip group 20 are within a length range of the first groove.

In an embodiment, the feed line 1 includes a first phase regulator 2, a second phase regulator 3, a first impedance converter 4, a second impedance converter 5 and a third impedance converter 6, where the first phase regulator 2 and the second phase regulator 3 are connected with the third impedance converter 6. The second impedance converter 5 and the third impedance converter 6 are connected through the first impedance converter 4. The chair-like groove 7 corresponds to a joint of the first impedance converter 4 and the second impedance converter 5. The chair-like groove 7 traverses adjacent the joint of the first impedance converter 4 and the second impedance converter 5.

In an embodiment, the first metal transmission strip group 21 includes a first metal transmission strip 13, a second metal transmission strip 14 and a third metal transmission strip 15, where the first metal transmission strip 13, the second metal transmission strip 14 and the third metal transmission strip 15 are arranged at one side of the third dielectric substrate 12 away from the fourth dielectric substrate 19 at equal intervals.

In an embodiment, the second metal transmission strip group 20 includes a fourth metal transmission strip 23, a fifth metal transmission strip 24 and a sixth metal transmission strip 25, where the fourth metal transmission strip, the fifth metal transmission strip and the sixth metal transmission strip are arranged on one side of the fourth dielectric substrate 19 adjacent to the third dielectric substrate 12 at equal intervals.

In an embodiment, an upper surface of the second dielectric substrate 11 is provided with a first rectangular radiating unit 16 and a second rectangular radiating unit 17, where the first rectangular radiating unit 16 is connected with the first metal transmission strip group 21. The second rectangular radiating unit 17 is connected with the second metal transmission strip group 20, and the first rectangular radiating unit 16 and the second rectangular radiating unit 17 are symmetrically arranged to form a dipole pair.

In an embodiment, the reflecting plate 9 adopts a copper plate. A phase of the antenna is controlled by controlling and adjusting the feed line 1 and shapes of the chair-like groove 7 on the ground 8 with the chair-like groove.

The above contents are explained in detail with the attached drawings.

As shown in FIG. 1, FIG. 2, FIG. 3 and FIG. 4, the application provides a broadband 5G circularly polarized filtering antenna. The broadband 5G circularly polarized filtering antenna includes the reflecting plate 9 adopting a copper plate, the first dielectric substrate 10, the second dielectric substrate 11, the third dielectric substrate 12 and the fourth dielectric substrate 19, the feed line 1 with a phase adjustment function printed on one surface of the first dielectric substrate 10, the ground 8 with the chair-like groove on an other surface of the first dielectric substrate 10, the first rectangular radiating unit 16, the second rectangular radiating unit 17, the first metal transmission strip 13, the second metal transmission strip 14, the third metal transmission strip 15, the fourth metal transmission strip 23, the fifth metal transmission strip 24 and the sixth metal transmission strip 25. The antenna adjusts the chair-like groove 7 through the ground with the chair-like groove on the other surface of first dielectric substrate 10, thereby realizing the design of the broadband circularly polarized antenna and realizing filtering performance through the six metal transmission strips.

The circular polarization characteristics of the antenna is realized by adjusting the size of the chair-like groove 7 on the ground 8 with the chair-like groove on the other surface of the first dielectric substrate 10 and the structure of the feed line 1 with the phase adjustment function on the one surface of the first dielectric substrate 10, and adjusting the antenna to achieve broadband and phase difference, so as to realize the design of the broadband circularly polarized antenna. Moreover, the phase adjustment function on the feed line 1 with the phase adjustment function, the impedance converter and the chair-like groove 7 on the ground 8 with the chair-like groove are able to improve the bandwidth of the antenna, so as to realize the design of broadband circularly polarized antenna.

The filtering characteristics of the antenna are realized by a filtering structure including the six metal transmission strips printed on the third dielectric substrate 12 and the fourth dielectric substrate 19 respectively, so as to realize filtering function and there are three metal transmission strips on the third dielectric substrate 12 and the fourth dielectric substrate 19 respectively.

One end of the first metal transmission strip group 21 and the second metal transmission strip group 20 are connected with the ground 8 with the chair-like groove, and the other ends of the first metal transmission strip group 21 and the second metal transmission strip group 20 are respectively connected with the first rectangular radiating unit 16 and the second rectangular radiating unit 17. The first rectangular radiating unit 16 and the second rectangular radiating unit 17 are printed on the second dielectric substrate 11 to form a pair of dipole pair, and a beam symmetry design is realized and in order to cover the corresponding metal transmission strips, and shapes of the first rectangular radiating unit 16 and the second rectangular radiating unit 17 may be designed into rectangles, circles or other shapes according to actual needs, so as to provides good omnidirectional radiation characteristics.

The function of copper plate is to provide a reflecting plate for the antenna, realize directional radiation and improve a front-to-rear ratio of the antenna.

Figure 5:
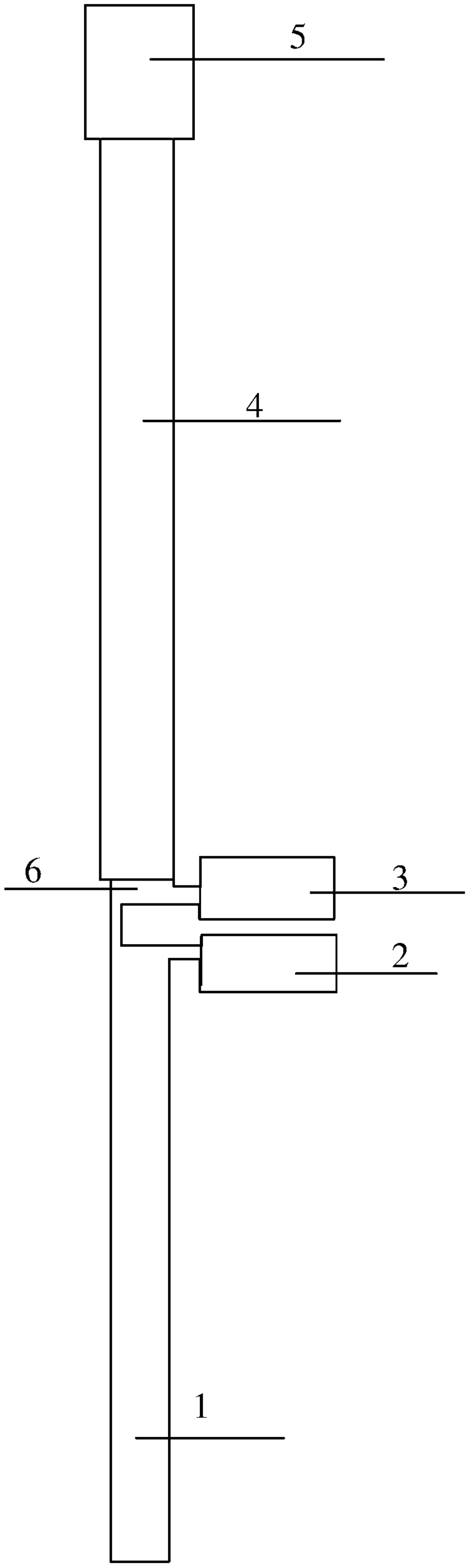
FIG. 5 is a schematic diagram of a feed line with phase adjustment function provided by an embodiment of the present application.

FIG. 5 provides the feed line 1 with the phase adjustment function. The feed line 1 feeds in a form of a microstrip antenna, and the stepped impedance conversion, the first phase regulator 2, the second phase regulator 3 and impedance adjustment stubs are integrated on the transmission line, so that the phase of the antenna is adjusted.

FIG. 6 provides the broadband 5G filtering circularly polarized antenna, including the ground 8 etched with the chair-like groove. Etching chair-like groove 7 on the ground not only expands the impedance bandwidth of the antenna, but also changes the phase of the antenna by adjusting different segments of the chair-like groove 7. The chair-like groove 7, together with the feed line 1 with the phase adjustment function controls the phase of the antenna, thus realizing the design of the circularly polarized antenna. In addition, the chair-like groove 7 is also able to expand the bandwidth of the antenna.

Figure 7:
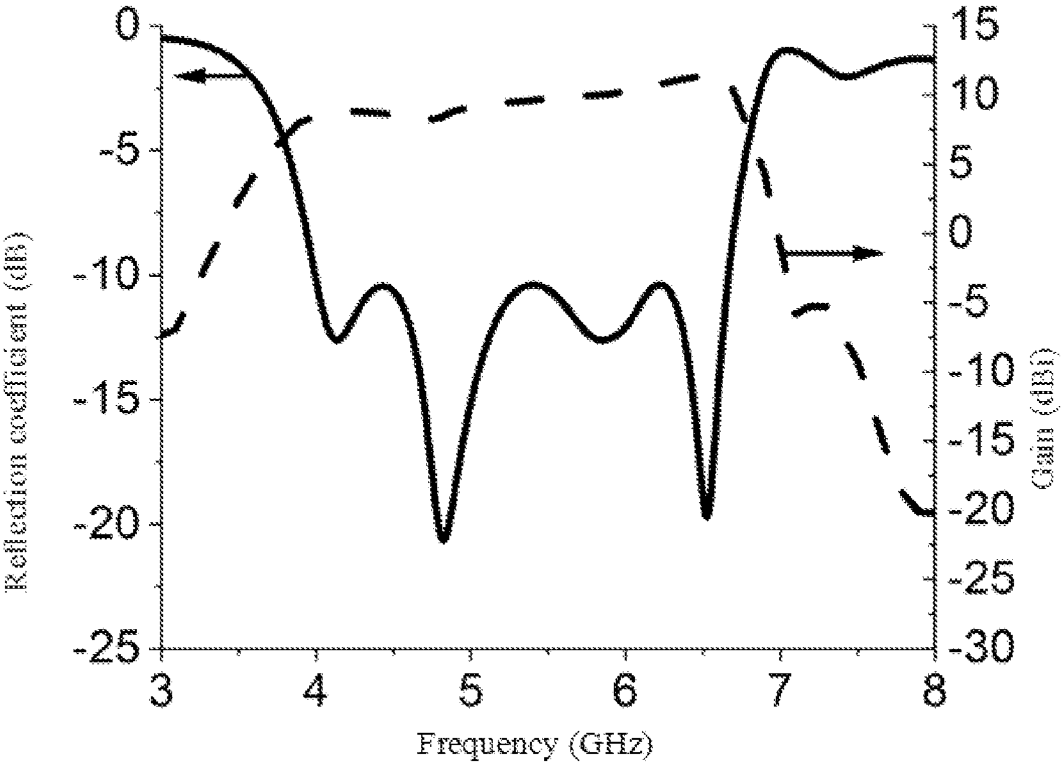
FIG. 7 is a schematic diagram of impedance characteristics and filtering characteristics provided by an embodiment of the present application.

FIG. 7 provides the impedance characteristics and filtering characteristics of the broadband 5G circularly polarized filtering antenna. From the figure, it can be seen that the designed circularly polarized antenna covers 4 GHz and 6.6 GHz, and has a good rectangular coefficient in a transition band to suppress the interference of out-of-band signals.

Figure 8:
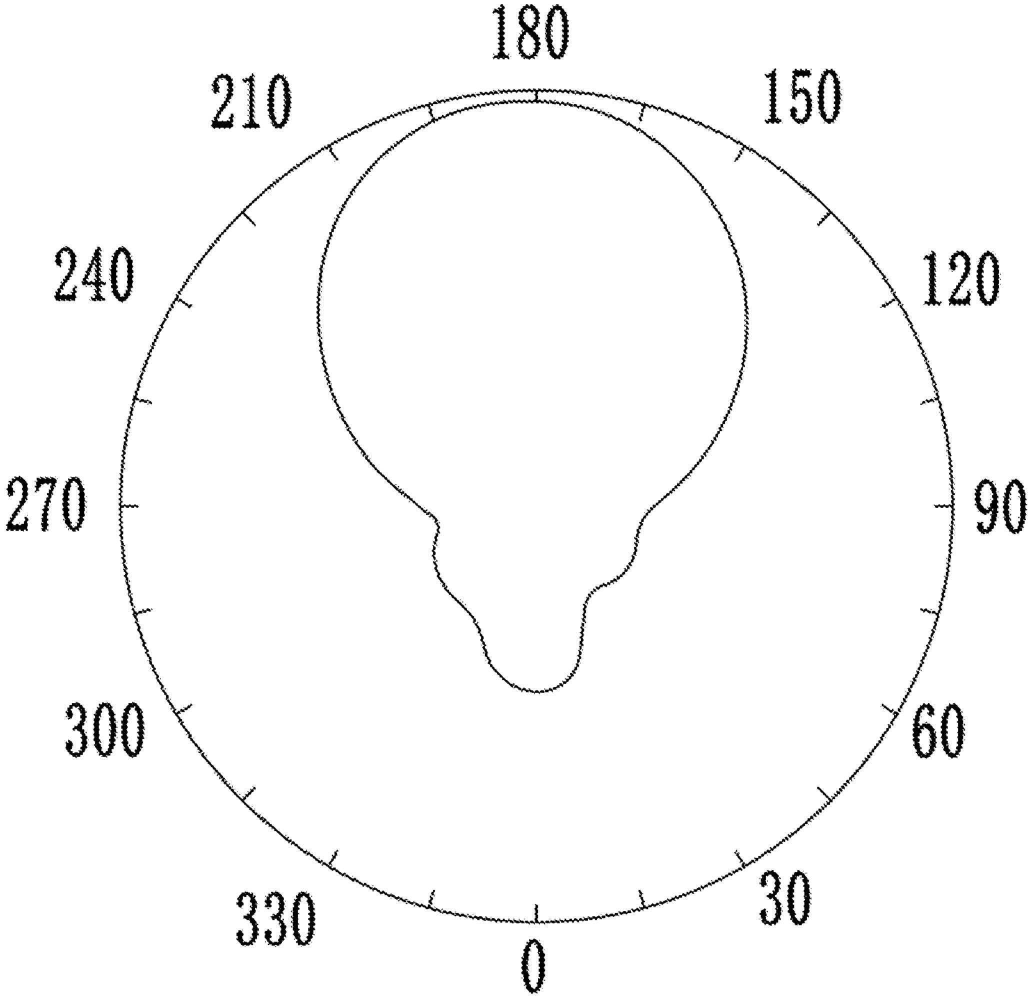
FIG. 8 is a schematic diagram of a radiation pattern provided by an embodiment of the present application.

FIG. 8 provides the radiation characteristics of the broadband 5G circularly polarized filtering antenna, and it can be seen that the provided antenna has good directional radiation characteristics.

The broadband 5G circularly polarized filtering antenna designed by the application can work in 5G frequency bands, C-bands, Wireless Local Area Network (WLAN) and Wireless Fidelity (WiFi) frequency bands, has good broadband characteristics, circular polarization characteristics, good axial ratio and wider beam bandwidth, may be applied to mobile communication terminals, and has a good application prospect.

The basic principle, main features and advantages of the present application have been shown and described above. It should be understood by those skilled in the art that the present application is not limited by the above-mentioned embodiments, and what is described in the above-mentioned embodiments and descriptions only illustrates the principles of the present application. Without departing from the spirit and scope of the present application, there will be various changes and improvements in the present application, which fall within the scope of the claimed application. The scope of the present application is defined by the appended claims and their equivalents.

What is claimed is:

1. A broadband 5G circularly polarized filtering antenna, comprising:

a reflecting plate, a first dielectric substrate, a second dielectric substrate, a third dielectric substrate and a fourth dielectric substrate, wherein the reflecting plate, the first dielectric substrate and the second dielectric substrate are arranged from bottom to top and are filled with air in middle, the third dielectric substrate and the fourth dielectric substrate are installed between the first dielectric substrate and the second dielectric substrate, and the third dielectric substrate and the fourth dielectric substrate are arranged in parallel, an upper surface of the first dielectric substrate is provided with a ground with a chair-like groove, a lower surface of the first dielectric substrate is provided with a feed line, the feed line is vertically aligned with a center of the third dielectric substrate, the chair-like groove on the ground with the chair-like groove comprises a first groove, wherein the first groove is arranged between the third dielectric substrate and the fourth dielectric substrate;

the third dielectric substrate is provided with a first metal transmission strip group, and the fourth dielectric substrate is provided with a second metal transmission strip group, wherein the first metal transmission strip group and the second metal transmission strip group are symmetrically arranged, the first metal transmission strip group and the second metal transmission strip group are in contact with the ground with the chair-like groove, the first groove is arranged between the first metal transmission strip group and the second metal transmission strip group and parallel to the first metal transmission strip group and the second metal transmission strip group;

the first metal transmission strip group comprises a first metal transmission strip, a second metal transmission strip and a third metal transmission strip arranged at equal intervals;

the second metal transmission strip group comprises a fourth metal transmission strip, a fifth metal transmission strip and a sixth metal transmission strip arranged at equal intervals; and an upper surface of the second dielectric substrate is provided with a first rectangular radiating unit and a second rectangular radiating unit, wherein the first rectangular radiating unit is connected with the first metal transmission strip group, the second rectangular radiating unit is connected with the second metal transmission strip group, and the first rectangular radiating unit and the second rectangular radiating unit are symmetrically arranged to form a dipole pair.

2. The antenna according to claim 1, wherein the chair-like groove on the ground with the chair-like groove further comprises, a second groove and a third groove, the third groove and the second groove are communicated with the first groove, angles formed by the second groove and the third groove and the first groove are equal.

3. The antenna according to claim 1, wherein the feed line comprises a first phase regulator, a second phase regulator, a first impedance converter, a second impedance converter and a third impedance converter, the first phase regulator and the second phase regulator are connected with the third impedance converter, the second impedance converter and the third impedance converter are connected through the first impedance converter, and the chair-like groove corresponds to a joint of the first impedance converter and the second impedance converter.

4. The antenna according to claim 1, wherein the first metal transmission strip group comprises the first metal transmission strip, the second metal transmission strip and the third metal transmission strip; and the first metal transmission strip, the second metal transmission strip and the third metal transmission strip are arranged at one side of the third dielectric substrate away from the fourth dielectric substrate at equal intervals.

5. The antenna according to claim 1, wherein the second metal transmission strip group comprises the fourth metal transmission strip, the fifth metal transmission strip and the sixth metal transmission strip; and the fourth metal transmission strip, the fifth metal transmission strip and the sixth metal transmission strip are arranged on one side of the fourth dielectric substrate adjacent to the third dielectric substrate at equal intervals.

6. The antenna according to claim 1, wherein the reflecting plate adopts a copper plate.

* * * * *